Oct. 23, 1962 D. R. HOLCOMB 3,060,364

PARAMETRIC FREQUENCY MULTIPLIER

Filed June 11, 1959

INVENTOR.
DON R. HOLCOMB,
BY Walter J. Adam
ATTORNEY.

United States Patent Office 3,060,364
Patented Oct. 23, 1962

3,060,364
PARAMETRIC FREQUENCY MULTIPLIER

Don R. Holcomb, Los Angeles, Calif., assignor to Hughes Aircraft Company, Culver City, Calif., a corporation of Delaware Filed June 11, 1959, Ser. No. 819,727
8 Claims. (Cl. 321—69)

Figure 1:
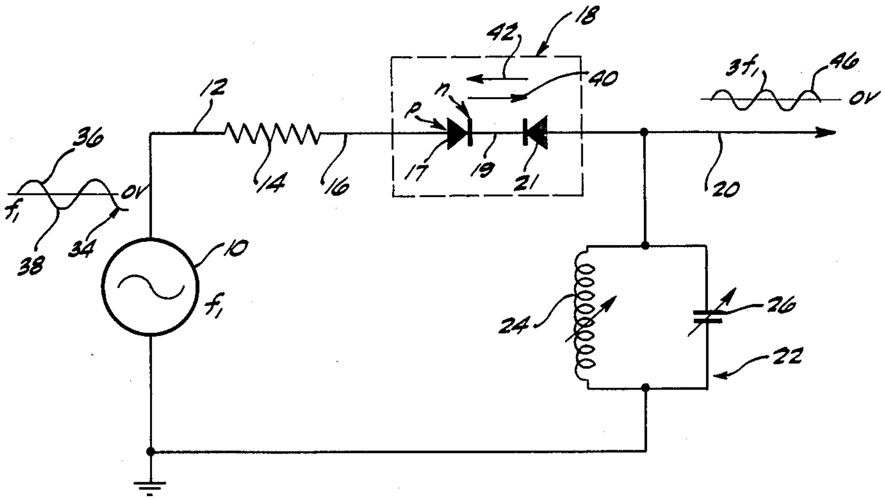

This invention relates to harmonic generators and particularly to a parametric frequency multiplier for generating signals at a desired odd harmonic frequency of an input signal.

There are many uses for a simplified circuit which efficiently multiplies the frequency of an input signal. One use for an efficient frequency multiplier is to provide a power source for high frequency signals in a radar transmitter. Klystron devices are presently used to provide transmitted signals at very high frequencies such as at 40 to 50 KMC (thousand megacycles). However, klystrons which operate at these high frequencies are not capable of developing signals at a high power level. Also klystron devices which operate at these high frequencies have a very short lift and are extremely expensive to construct campared to klystrons which operate at conventional lower frequencies. A frequency multiplier which multiplies the signal from a klystron operating at a conventional radar frequency and a high power level to a signal at a very high frequency with a high power level would be a great advance in the radar art. Also by utilizing a lower frequency klystron and a frequency multiplier, the klystron for a given transmitted frequency is less expensive and has a longer operating life.

In the prior art, some frequency multipliers or harmonic generators utilize the nonlinear resistance characteristics of conventional diodes driven by a signal generator, which circuits have a low conversion efficiency. Other harmonic generators utilize a single nonlinear capacitance driven by a signal generator to develop desired harmonic frequencies and are, also, found to have a low efficiency. Other prior art frequency multipliers utilize a multiple stage parametric combination which receives a signal from an oscillator and for each stage include a nonlinear reactance and a tank circuit. The output of the second stage, for example, is the third harmonic of the pumping signal. This circuit has the disadvantage of a large number of components, and a low efficiency. A circuit which generates the odd harmonic signals, such as the third harmonic, with a minimum number of components and with a high efficiency would be very advantageous to the radar art as well as to other arts.

It is, therefore, an object of this invention to provide a simplified parametric harmonic signal generator;

It is another object of this invention to provide a frequency multiplier which has a high efficiency, so as to result in a saving of power;

It is a further object of this invention to provide a simplified and highly efficient generator of odd harmonic signals of an input signal utilizing diodes having a nonlinear capacitive characteristic;

It is a further object of this invention to provide an improved frequency multiplier to operate at high frequencies and which utilizes the nonlinear capacitive characteristic of diodes combined in a double arrangement to give a high efficiency.

Briefly, one form of the frequency multiplier of the present invention consists of a variable reactance circuit made up of two diodes having nonlinear capacitive characteristics and with either their anodes or their cathodes connected together. One end of the reactance circuit is connected to a signal source supplying a signal of a fundamental frequency and the other end is connected to a resonant circuit tuned to a desired odd harmonic of the fundamental frequency. The two diodes are connected to the signal source to provide a capacitance variation of twice the fundamental frequency which reacts in series with the signal from the source to form current components representing the odd harmonic frequencies of the fundamental frequency. The resonant circuit acts to present a high impedance to current signals at the desired odd harmonic frequency and to pass signals of all other frequencies as a substantially short circuit. This circuit provides a highly efficient generator of voltage signals at a desired odd harmonic frequency.

Figure 2:
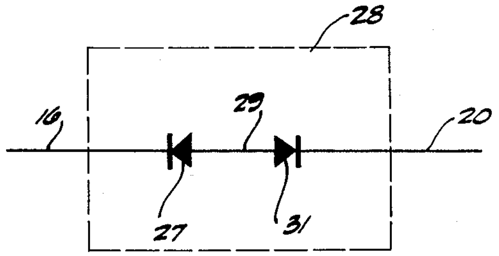

The novel features of this invention, both as to its organization and method of operation, will best be understood from the accompanying description, taken in connection with the accompanying drawing, in which like reference characters refer to like parts, and in which:

FIG. 1 is a schematic circuit diagram of the harmonic generator of this invention; and FIG. 2 is a schematic circuit diagram of an alternate arrangement of the diodes of FIG. 1.

Referring first to FIG. 1 which shows a circuit diagram of the frequency multiplier of this invention, the circuit connections will be explained. A sine wave generator 10 is provided and is connected so as to be referenced to ground potential, for example. A signal lead 12 is connected from the generator 10 to one end of a resistor 14, which represents the inherent source resistance of the generator 10. The other end of the resistor 14 is connected to one end of a voltage variable reactance circuit 18 by a lead 16. The other end of the variable reactance circuit 18 is connected to an output lead 20 upon which a signal of the desired frequency is formed, as will be explained subsequently. The lead 20 is connected to one end of a parallel resonant or tank circuit 22, which includes an inductance 24 and a capacitor 26 connected in parallel, and which may be of the variable type. The other end of the tank circuit 22 is connected to ground potential, for example. The tank circuit is tuned to a desired output frequency. The voltage variable reactance 18 includes diodes 17 and 21 having nonlinear capacitance characteristics. The diode 17 has its anode connected to the lead 16 and its cathode connected to a lead 19. The diode 21 has its cathode connected to the lead 19 and its anode connected to the lead 20. As will be discussed subsequently, the double diode arrangement forms current signals which results in a highly efficient frequency multiplying circuit.

Referring now to FIG. 2, a variable reactance circuit 28 is shown as an alternative arrangement for the double diode reactance circuit 18 of FIG. 1. The variable reactance circuit 28 includes diodes 27 and 31 having nonlinear capacitance characteristics. The diode 27 has its cathode connected to the lead 16 and its anode connected to a lead 29. The second diode 31 has its anode connected to the lead 29 and its cathode connected to the lead 20. Thus the voltage variable reactance circuit 28 includes diodes connected in an anode to anode arrangement while the voltage variable reactance circuit 18 of FIG. 1 includes diodes connected in a cathhode to cathode arrangement. It is to be noted that all of the leads of FIGS. 1 and 2 may be waveguides when operating at microwave frequencies, with the energy transferred in and out of the variable reactance circuits 18 and 28 by probes (not shown) for example.

The diodes 17, 21, 27 and 31 are semiconductor diodes whose capacitance is varied by a variation in voltage. As is well known, diodes of this type consist of a p zone having positive carriers corresponding to the anode end, an n zone having negative carriers corresponding to the cathode end, and a thin depletion zone in between the two other zones with relatively few carriers therein. The p and n zones are shown for the diode 17. When a potential is applied to one of these diodes which is positive on the anode side and negative on the cathode side, carriers act to bridge the depletion zone to form a conducting path through the diode. When the applied potential is reversed, the depletion zone reappears and insulates the two sides of the diode from each other which is known as a back biased condition. It is primarily in this back biased condition that the diode acts as a variable capacitance. A back biased potential across the diode causes the carriers to be pulled away from the depletion zone. The greater the potential applied in a back biased direction across the diode, the further the carriers are pulled away from the depletion zone and the lower is the capacitance of the diode. It is to be noted that the static characteristic of the diodes is such that they act as a capacitance for a very small voltage range in the forward biased condition. However, as will be explained subsequently, the dynamic operation of the double diodes of this invention acts to prevent capacitance being formed in this small forward biased region. The diodes utilized in this invention, for example, may be "Varicap" silicon junction diodes manufactured by Pacific Semiconductor's Inc., Culver City, California.

A simpler device having the same operational characteristics may also be utilized for the double diode arrangement of FIGS. 1 and 2. For the connection of FIG. 1 a single block of semiconductor material forming an n zone may be utilized with a separate body of semiconductor material forming p zones diffused or attached to each end, with depletion zones at the junction of each p zone with the n zone. The arrangement of FIG. 2 may be constructed in a similar manner except a single block of material forming a p zone may have two bodies of semiconductor material forming an n zone diffused or attached thereto.

The operation of the circuits of this invention will now be explained by referring to FIGS. 1 and 2. The sine wave generator 10 develops a signal as shown by a waveform 34 which oscillates above and below a reference level which is shown as 0 volts. This signal which is at a fundamental frequency $f_1$ is continually passed to the variable reactance circuit 18. During a positive alternation 36 of the waveform 34, the diode 17 is biased into conduction and the diode 21 is reverse biased because the output lead 20 is referenced to ground potential through the tank circuit 22. Thus, current flows, as indicated by an arrow 40, through the diode 17, which is conductive, to the diode 21, which is then biased to provide a variable capacitance. During a negative alternation 38 of the waveform 34, the diode 21 is biased into conduction and the diode 17 is reverse biased by the ground potential on the output lead 20. Thus, current flows as indicated by an arrow 42 through the diode 21 which is conductive to the diode 17 which is then biased to provide a variable capacitance. One result of this operation is that a varying capacitance is formed at two times the fundamental frequency $f_1$ looking from the lead 20 into the variable reactance circuit 18. As will be explained subsequently, the nonlinear variable capacitance of the diodes translates the signal of the waveform 34 to form current components at all of the odd harmonic frequencies of $f_1$. These current components form voltage signals such as shown by a third harmonic signal of a waveform 46, because of their passing through the impedance of the tank circuit 22 to ground, for example. The output signal such as shown by the waveform 46 is referenced to ground since alternating current passes from the variable reactance circuit 18 through the tank circuit 22 to ground.

The action of the diode arrangement of FIG. 2 is similiar except that the current flows in opposite directions to that discussed above for a positive portion 36 or a negative portion 38 of the signal of the waveform 34.

The tank circuit 22, when the multiplier circuit operates as a frequency tripler for example, is tuned to store energy at a frequency of $3f_1$ so as to have a high impedance to current components at this frequency. Thus, the current components at a frequency of $3f_1$ passing to the reference potential shown as ground form voltage signals at this frequency on the output lead 20 as shown by the waveform 46. At other frequencies above and below $3f_1$, the tank circuit 22 presents a low impedance to ground, acting as a short circuit to current components of all harmonics of undesired frequency so that voltage signals at these undesired frequencies are not developed on the output lead 20.

As discussed above, the operation of the diodes of the reactance circuits 18 or 28 is not adversely affected by the characteristic that a single diode acts as a capacitance for a small voltage region when in the forward biased condition. In operation, the diode 17, for example, is biased in the forward direction as determined by the rate of change of the charge or the current flowing therefrom. The operation point of the other diode 21 is determined by the total charge that has passed from the depletion zone of the diode 17. Thus, one diode controls the operation of the other so that in response to the alternating signal, one diode begins to conduct just as the other reaches its minimum capacitance value.

The generation of the harmonics by an element having non-linear characteristics is well known in the art, as explained in an article by Manley and Rowe in Proceedings of the IRE, July 1956, entitled "Some General Properties of Non-Linear Elements—Part I. General Energy Relations." The variable reactance circuit 18 or 28 has been found by a similar Fourier analysis to generate only odd harmonics of the driving signal. Analytical and experimental results have indicated that the circuit of the invention utilizing double diodes has a greater efficiency than a similar circuit utilizing single diodes when the diodes all have the same capacity characteristics.

The frequency multiplier of this invention has been operated satisfactorily over a frequency range of the signal of the waveform 34 from the generator 10 between 2 to 6 megacycles. The circuit also operates at frequencies of 40 to 50 KMC, since non-linear capacitance type of diodes have been found to be operable at these high frequencies. It is to be noted that the principles of this invention may be utilized for operation at other frequency ranges and are not limited to the above frequency ranges.

Thus, there has been described a simplified and highly efficient parametric frequency multiplier. The circuit forms the third harmonic of the driving signal or any desired odd harmonic as determined by the frequency at which the tank circuit is tuned. This circuit operates with high efficiency at a very high frequency to provide a simplified means to increase the frequency at which radar transmission may be made.

I claim:

1. A circuit responsive to alternating signals at a first frequency from a signal source to develop output signals at odd harmonic frequencies of said first frequency, said circuit comprising a first diode having a first and a second end with said first end coupled to said signal source, a second diode having a first and a second end with said first end coupled to the second end of said first diode and the second end coupled to the circuit output, said first and second diodes having nonlinear capacitive characteristics, and frequency selective impedance means coupled to the second end of said second diode, said first and second diodes acting to form alternately a conducting path and a voltage variable capacitance in response to said alternating singals to apply signals at only odd harmonic frequencies of said first frequency to said impedance means, said impedance means selecting a desired odd harmonic frequency.

2. A frequency multiplier comprising a source of signals at a fundamental frequency, a tank circuit tuned to a desired odd harmonic frequency of said fundamental frequency and having one end coupled to said source, a series circuit of two diodes connected between said source and the other end of said tank circuit, said diodes being poled in opposite senses and having nonlinear capacitive characteristics, said series circuit in response to the signals at the fundamental frequency forming current signals at only odd harmonic frequencies of said fundamental frequency, and said tank circuit responding to said current signals to develop signals at the desired odd harmonic frequency.

3. A circuit for multiplying the frequency of signals from a first frequency to a second frequency being a selected odd harmonic of said first frequency, said circuit comprising a source of signals at a first frequency, a first diode having one end coupled to said source of signals, a second diode having one end coupled to the other end of said first diode, said first and second diodes acting alternately to conduct and to form a voltage variable capacitance in response to signals of said first frequency and to apply a plurality of signals at only odd harmonic frequencies of said first frequency to the other end of said second diode, a point of reference potential, a parallel resonant circuit coupled between said other end of said second diode and said point of reference potential, said parallel resonant circuit presenting a high impedance to the signal of said plurality of signals at said second frequency and a low impedance to said plurality of signals developed at other frequencies.

4. A frequency multiplier comprising a point of potential, a source of alternating signals at a fundamental frequency and referenced to the potential of said point, a first diode having an anode and a cathode with the anode coupled to said source of alternating signals, a second diode having an anode and a cathode with the cathode coupled to the cathode of said first diode and the anode coupled to an output terminal, said first and second diodes conducting current when biased in a forward direction by the alternating signals and when biased in a reverse direction by the alternating signals, forming a capacitive reactance which varies with the voltage of the alternating signals to apply current signals to the anode of said second diode at only odd harmonic frequencies of said fundamental frequency, a parallel resonant circuit including a parallel inductance and a capacitance coupled between the anode of said second diode and said point of potential to present a high impedance to current signals at a desired odd harmonic frequency and a low impedance to current signals at other odd harmonic frequencies, whereby the current passing alternately through said first and second diodes to the capacitive reactance of the other diode develops signals at the desired odd harmonic frequency which are passed to the output terminal.

5. A circuit for responding to a first signal at a first frequency to apply a signal to an output at a second frequency which is a desired odd harmonic of said first frequency, said circuit comprising a point of reference potential, a source of said first signals coupled to said point of reference potential to reference said signals thereto, a first diode coupled to said source of first signals, a second diode coupled to the first diode and to the output, said first and second diodes acting jointly in response to said first signals to develop current signals at only odd harmonic frequencies, circuit means coupled between said second diode and said point of reference potential, said circuit means acting to present a high impedance to current signals at said second frequency and a low impedance to signals at other odd harmonic frequencies to thereby pass signals at only said second frequency to said output.

6. A frequency multiplier comprising a potential point, a source of alternating signals coupled to said potential point so as to be referenced to the potential thereof, a first diode having a p region and an n region with said n region coupled to said source of alternating signals, a second diode having a p region and an n region with said p region coupled to the p region of said first diode, said first and second diodes having nonlinear capacitive characteristics to develop a combined capacitance characteristic and provide current signals at only odd harmonic frequencies of said fundamental frequency, and a resonant circuit coupled between the n region of said second diode and said potential point, said resonant circuit presenting a high impedance to current signals developed at a desired odd harmonic frequency and presenting a low impedance to odd harmonic current signals developed by said diodes at other frequencies.

7. A frequency multiplier comprising a potential point, a source of alternating signals having a fundamental frequency and coupled to said potential point so as to be referenced to the potential thereof, a first diode having a p region and n region with said p region coupled to said source of alternating signals, a second diode having a p region and an n region with sadi p region coupled to the n region of said first diode, said first and second diodes having nonlinear capacitive characteristics to develop a combined capacitance characteristic and provide current signals at only odd harmonic frequencies of said fundamental frequency, and a resonant circuit coupled between the p region of said second diode and said potential point, said resonant circuit presenting a high impedance to current signals developed at a desired odd harmonic frequency which is a multiple of the fundamental frequency and presenting a low impedance to odd harmonic current signals developed by said diodes at other frequencies.

8. A frequency multiplier for passing a signal to an output terminal comprising a potential point, a source of signals at a first frequency coupled to said potential point so as to reference the signals to the potential of said point, a first diode coupled to said source to receive the signals at said first frequency, a second diode coupled between said first diode and said output terminal, said first and second diode conducting current when biased in a first direction and forming a voltage variable capacitance when biased in a second direction, a resonant circuit coupled between said output terminal and said potential point, said circuit having a high impedance to current signals at frequencies which are a desired odd harmonic frequency of said first frequency and a low impedance to current signals at other frequencies, said diodes acting to form current signals through said diodes at a plurality of odd and even harmonic frequencies and to cancel the even harmonic frequencies, said current signal at the desired odd harmonic frequency forming voltages at said terminal when passing through the impedance of said resonant circuit.

References Cited in the file of this patent

UNITED STATES PATENTS

| | | |
|---|---|---|
| 1,908,249 | Hund | May 6, 1933 |
| 2,291,366 | Benz | July 28, 1942 |
| 2,294,067 | Benz | Aug. 25, 1942 |
| 2,443,094 | Carlson et al. | June 8, 1948 |
| 2,777,956 | Kretzmer | Jan. 15, 1957 |
| 2,815,488 | Von Neumann | Dec. 3, 1957 |
| 2,944,205 | Keizer et al. | July 5, 1960 |
| 2,964,646 | Helms | Dec. 13, 1960 |
| 2,969,497 | Zen-Iti Kiyasu et al. | Jan. 24, 1961 |

UNITED STATES PATENT OFFICE

CERTIFICATE OF CORRECTION

Patent No. 3,060,364 October 23, 1962

Don R. Holcomb

It is hereby certified that error appears in the above numbered patent requiring correction and that the said Letters Patent should read as corrected below.

Column 1, line 23, for "lift" read -- life --; column 6, line 24, for "sadi p" read -- said n --; line 49, after "are" insert -- at --.

Signed and sealed this 2nd day of April 1963.

SEAL)
\ttest:

STON G. JOHNSON
\ttesting Officer

DAVID L. LADD
Commissioner of Patents